Jan. 25, 1966  E. W. WORTHINGTON  3,230,879
UNDERSIDE TENSION LOCKUP APPARATUS
Filed Aug. 6, 1963  8 Sheets-Sheet 1
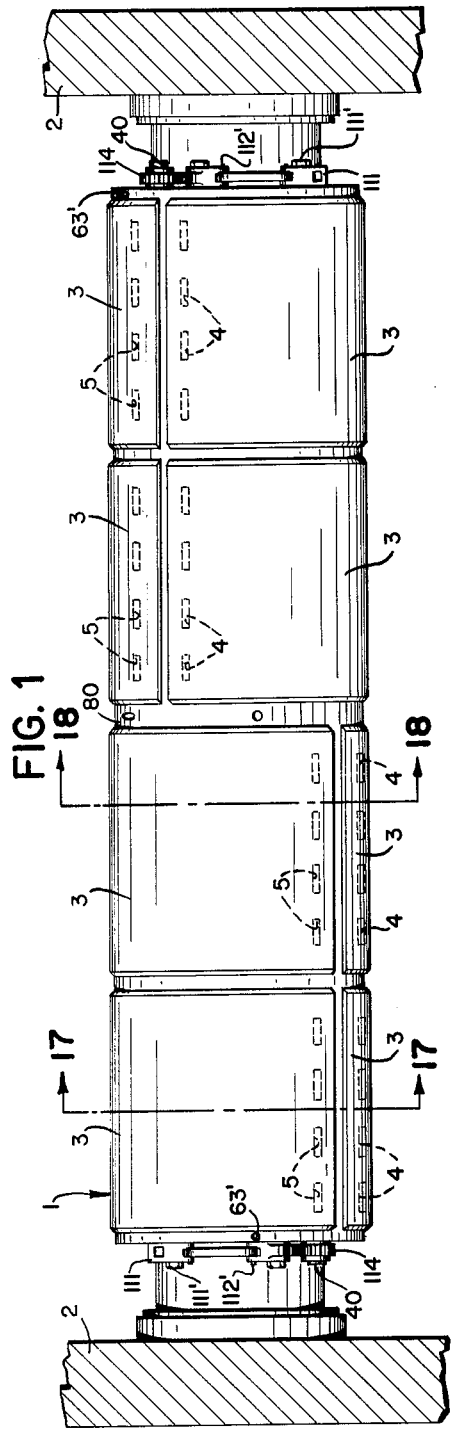
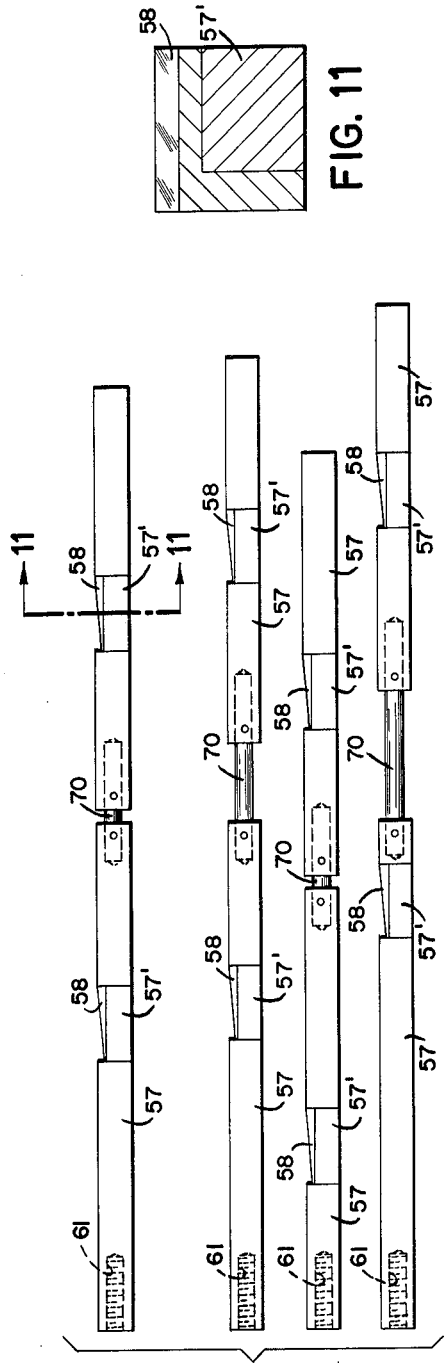
INVENTOR
EMORY W. WORTHINGTON
ATTORNEYS

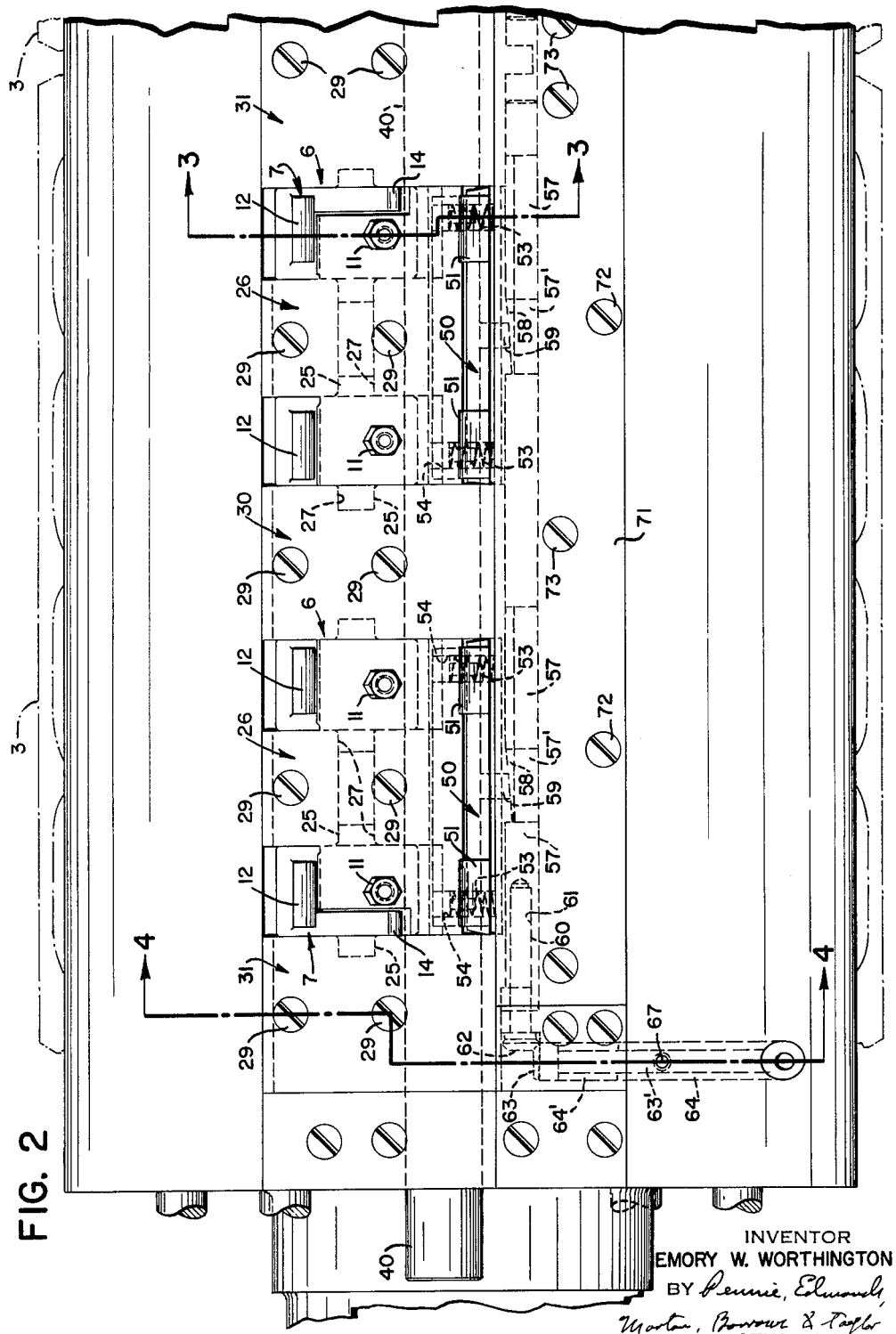

Jan. 25, 1966  E. W. WORTHINGTON  3,230,879
UNDERSIDE TENSION LOCKUP APPARATUS
Filed Aug. 6, 1963  8 Sheets-Sheet 3

INVENTOR
EMORY W. WORTHINGTON
BY
ATTORNEYS

Jan. 25, 1966  E. W. WORTHINGTON  3,230,879
UNDERSIDE TENSION LOCKUP APPARATUS
Filed Aug. 6, 1963  8 Sheets-Sheet 4
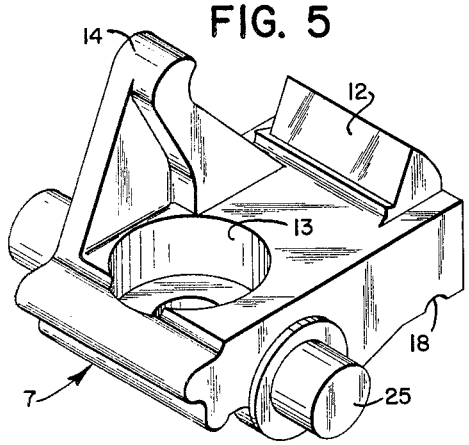
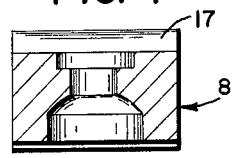
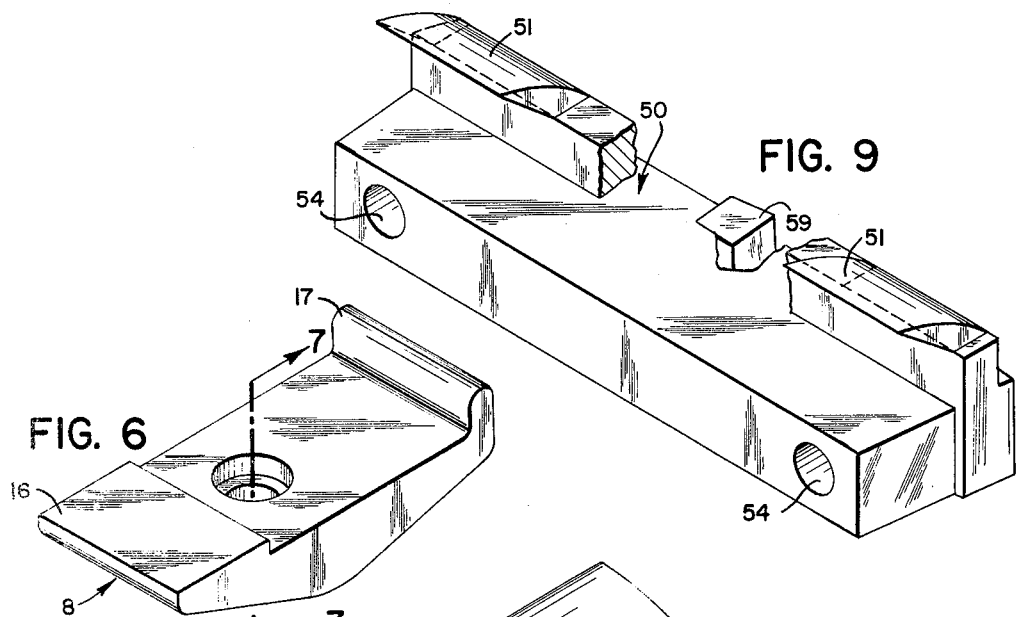
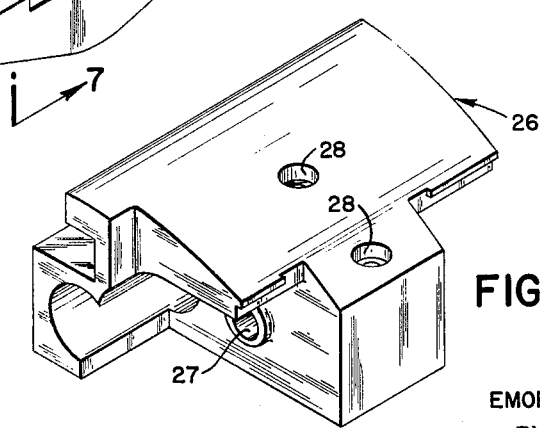
INVENTOR
EMORY W. WORTHINGTON
BY
Morton, Bomom & Taylor
ATTORNEYS Jan. 25, 1966  E. W. WORTHINGTON  3,230,879
UNDERSIDE TENSION LOCKUP APPARATUS
Filed Aug. 6, 1963  8 Sheets-Sheet 6

INVENTOR
EMORY W. WORTHINGTON
BY
ATTORNEYS

Jan. 25, 1966  E. W. WORTHINGTON  3,230,879
UNDERSIDE TENSION LOCKUP APPARATUS

Filed Aug. 0, 1963  8 Sheets-Sheet 8

INVENTOR
EMORY W. WORTHINGTON
BY
ATTORNEYS

United States Patent Office 3,230,879
Patented Jan. 25, 1966

3,230,879
UNDERSIDE TENSION LOCKUP APPARATUS
Emory W. Worthington, Ridgewood, N.J., assignor to Wood Newspaper Machinery Corporation, Plainfield, N.J., a corporation of Virginia
Filed Aug. 6, 1963, Ser. No. 301,700
6 Claims. (Cl. 101—378)

This invention relates to apparatus for locking stereotype printing plates onto printing cylinders and more particularly to an apparatus whereby printing plates are locked to printing cylinders by retractable hooks contained in the cylinders which engage recesses on the underside of the plates. This application is a continuation-in-part of my application, Serial Number 166,104, now abandoned, filed January 15, 1962.

Stereotype printing plates must be held to the printing cylinder with considerable force in order to overcome centrifugal forces which tend to cause the plate to be thrown from the printing cylinder when it is rotated at high speeds. The force necessary to lock printing plates on the cylinder where retractable hooks in the cylinder engage grooves in the bottom of the plate is on the order of 300 lbs. pressure per hook where four hooks are used to engage each end of a plate. It is desirable that the relatively heavy printing plates be locked to the printing cylinder securely and quickly and that they be easily adjustable with respect to the printing cylinder in order to provide accurate registering.

It is further desirable that the heavy printing rolls be constructed so that they will be subjected to a minimum of deflection caused by their heavy weight and so that they will be able to withstand impact forces caused by impression rollers contacting the gutter between adjacent printing plates without deflecting. It is further desirable that any machining of the printing rollers be kept at a minimum in order to reduce expense of manufacture.

Still a further desirable feature is that any adjustment of positioning of the plates on the cylinder be made so that the press operator may actually see the adjustment as it is made. This is particularly true where the press is to be used for color printing and where it is important that the register between colors be exact which in turn requires extremely accurate positioning of the plates on the cylinder.

A difficulty existing with conventional printing cylinders is, among other things, that they require complicated shaped machined slots in order to contain the hooks by which the plate is held to the cylinder and also to contain the adjustment mechanism by which the positioning of the plates on the cylinder may be varied. Another problem arising from conventional printing cylinders utilizing the underside lockup is that the machined slots often reduce the effective cross-sectional area of the cylinder below that which is necessary to resist deflection of the roll.

I propose to overcome the aforementioned difficulties inherent in conventional cylinders by machining diametrically opposed slots having flat side walls and into which are fitted the clamping and adjustment mechanisms. The slots for clamping the plates on one end of the cylinder extend approximately ½ the length of the cylinder while the slots on the other half of the cylinder extend approximately ½ the length of the cylinder but are positioned 90° with respect to the first-mentioned slots. The diametrically opposed slots on the same end of the cylinder are further positioned so that there is a maximum cross-sectional area between them. In this manner the effective moment of inertia is increased in order to overcome any deflection of the roller caused by its weight or caused by the impact of the impression roll against the gutter formed between adjacent plates.

A further difficulty of conventional printing cylinders utilizing the underside lockup for clamping the printing plates onto the printing cylinder is that the locking hooks of such cylinders cannot be easily varied across the length of the roll in order to accommodate printing plates of different widths or paper webs of different widths. Conventional cylinders require additional machining in order that the locking mechanism and particularly the locking hooks may be changed over the length of the cylinder. I propose to provide for individual clamping units which are self-contained in that they contain the locking hooks and springs necessary to move the hooks to lock the plates to the cylinder and which, because they are self-contained, can be positioned in a slot to accommodate various plate widths. The clamping units are rotatably supported by clamp supports held into a slot by screw means. The supports in turn surround a rotatable lockup shaft and their position in the slot may be varied to accommodate different web and plate widths.

In a preferred form of the clamping unit, I use Belleville type springs which are prestressed or preloaded and which are interposed between a pivotable hook member and an actuator arm. The actuator arm in turn contacts a cam surface on a rotatable lockup shaft in order that the preload exerted by the springs may be removed from the hook when the bar is turned in one direction to unclamp the hook from the printing plate and in order that the preload may be imparted to the hook when the bar is rotated in the opposite direction and the hooks are brought into locking engagement with the plate. Belleville springs have the characteristic that at a predetermined compression, they will exert a substantially constant pressure even though the springs are compressed further. This feature is advantageous when used with underside lockup mechanisms in that it insures a constant lockup force to be exerted by the clamping hooks on the plate even though the recesses in the plate may wear and enlarge thus allowing the hooks to move further into the plate. It is desirable that the clamping pressure be constant at a predetermined level since too much pressure may result in warping of the plate while too little pressure may result in the plate being loosely mounted on the cylinder.

In another embodiment of the clamping unit, I utilize a leaf type cantilever spring mounted at one end on the hook member in order to impart the preload onto the hook member. A lip is interposed between the bottom leaf of the spring and the hook member at the free end of the spring in order to preload the spring. In this particular form of the invention, a cam surface mounted on the rotatable lockup shaft is adapted to engage the free end of the cantilever spring. When the lockup shaft is rotated in a direction to bring the cam surface into contact with the bottom leaf at the free end of the spring, the hook member will rotate to engage a recess. Further rotation of the shaft will lift the lip off the hook member thus assuring that the hook will engage the recess with at least the preloaded force even though the hook wears further into the plate. Rotation of the lockup shaft in the opposite direction will allow the lip to come into contact with the bottom leaf of the spring in order to take up the preload and allow the hook to be rotated out of engagement with the plate. The clamping unit is self-contained as in the previously-described unit in that it may be easily removed from the cylinder and its position varied in a slot without removing the preload force from the unit. The clamping unit is rotatably mounted in adjacent clamp supports as is the first-mentioned clamping unit.

In addition, I further propose to utilize the torsional deflection of the rotatable lockup shaft caused by the high forces necessary to impart a preload into the hook members so that the various hooks are brought gradually into locking engagement with the plates rather than simultaneously. In this manner, the total force necessary to rotate the lockup shaft to a position where all hooks engage their recesses is reduced.

I propose to overcome the difficulty of register adjustment by positioning the register adjustment means for each of the printing plates in the immediate area of that plate. Thus in a printing cylinder having four axially adjacent printing plates, the adjustment means for the two outside plates will be located at the ends of the cylinder while the adjustment means for the two middle plates will be located substantially in the middle of the cylinder with all the adjustment means thus being in the area of each of the plates with which it is associated.

Referring to the drawings in which preferred embodiments of my invention are illustrated, FIG. 1 is a side view of a printing cylinder constructed according to my invention having four axially adjacent printing plates mounted thereon;

FIG. 2 is an enlarged plane view of a portion of the printing cylinder shown in FIG. 1 illustrating the register adjustment means;

FIG. 5 is an enlarged perspective view of the hook member shown in FIG. 3;

FIG. 6 is an enlarged perspective view of the actuator arm illustrated in FIG. 3;

FIG. 7 is a cross-sectional view of FIG. 6 taken along lines 7—7;

FIG. 8 is an enlarged perspective view of the clamp support illustrated in FIG. 3;

FIG. 9 is an enlarged perspective view of the register hook member illustrated in FIG. 3;

FIG. 10 is an enlarged side view of register adjustment bars illustrating a means for varying the length of the bars;

FIG. 11 is an enlarged cross-sectional view of FIG. 10 taken along lines 11—11;

Figure 3:
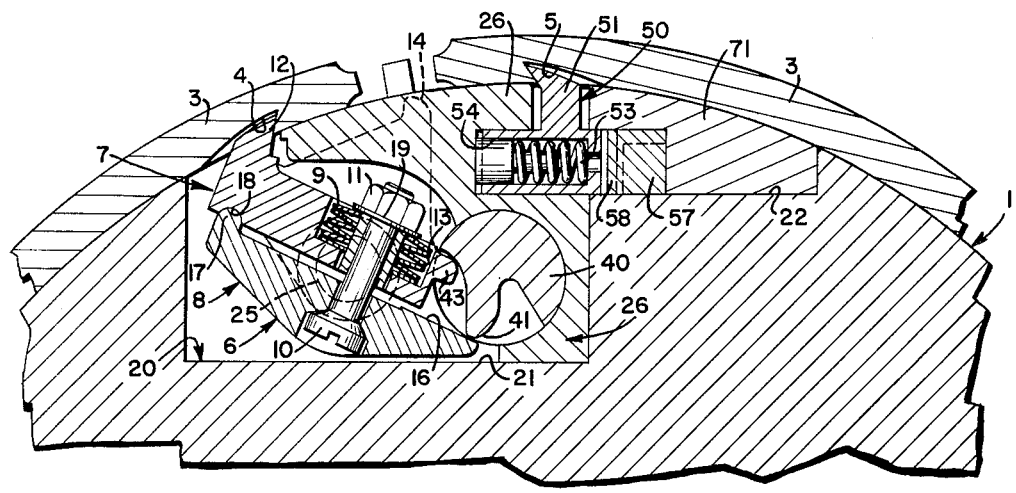
FIG. 3 is a cross-sectional view of a portion of FIG. 2 taken along lines 3—3.

Referring to the drawings in greater detail and in particular to FIG. 1, 1 illustrates a printing cylinder journalled into frame members 2 of a press. The printing cylinder has mounted thereon a plurality of stereotype printing plates 3 which are so arranged that they extend axially along the sides of the cylinder and are diametrically positioned on the cylinder. Each of the plates has a plurality of recesses 4 along an edge of the inside of the plate and a plurality of recesses 5 along an opposite edge of the inside of the plate.

Referring to FIG. 3, there is illustrated in greater detail a plate 3 mounted on the cylinder 1 with a recess 4 on an inside edge of the plate engaged by a clamping unit denoted generally by 6.

The clamping unit 6 in turn comprises a hook member 7, an actuator arm 8, and Belleville springs 9, all held together by means of a bolt 10 and a nut 11. As more clearly shown in FIG. 5, the hook member 7 has a hook 12 adapted to engage the recess 4. The member 7 further has a recess 13 in which are placed a plurality of superimposed disc-type Belleville springs 9. A plate lifting finger 14 extends from member 7 and is adapted to engage the end of a plate to lift it off the cylinder as more fully explained hereafter.

The actuator arm 8 as shown in FIG. 6 has a bearing face 16 adapted to contact the member 7. The other end of member 8 has a rounded portion 17 which bears on a groove 18 contained on the hook member 7. Arm 8 is mounted on hook member 7 with the springs 9 interposed between the washer 19 and the bottom of the recess 13. The bolt 10 extends through the arm so that when nut 11 is screwed down, the face 16 will be forced into contact with the member 7 in order to preload or prestress the springs. The members 7, 8, and 9 thus form a self-contained clamping unit which is insertable into an L-shaped groove denoted generally by 20 having a major leg 21 extending towards the center of the cylinder and a minor leg 22 extending perpendicular to the major leg.

Figure 4:
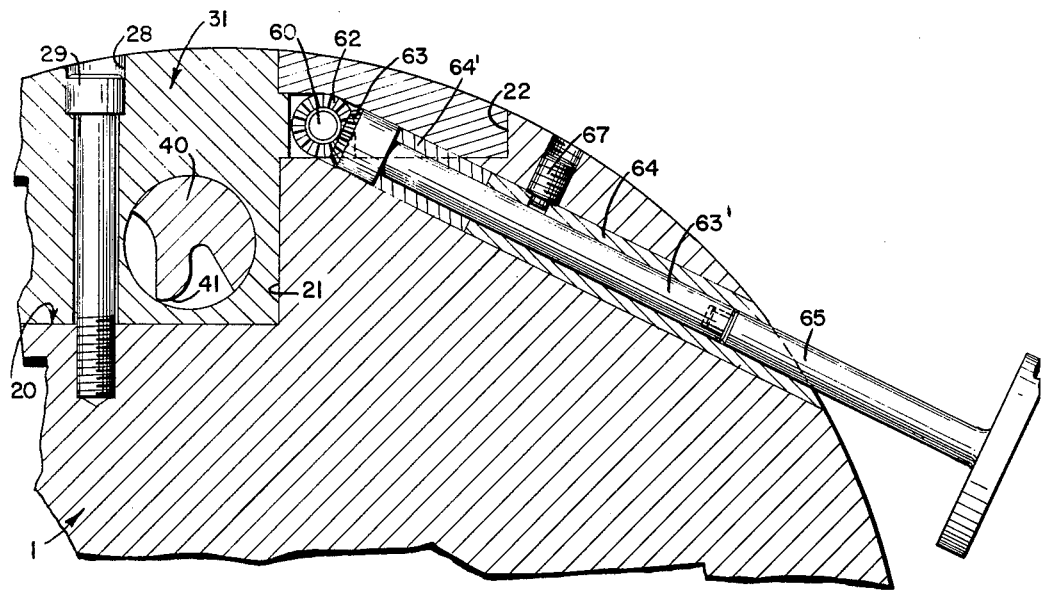
FIG. 4 is a cross-sectional view of a portion of FIG. 2 taken along lines 4—4.

The clamping unit 6 has thereon lugs 25 which are adapted to be rotatably received in clamp supports 26 and 30 or 26 and 31 also contained in the groove 20 as shown in FIG. 2. The support 26 as shown in FIG. 8 has bores 27 into which the lugs 25 are journalled and holes 28 to receive locking screws 29 as shown in FIG. 4 which lock the support 26 and associated clamping units into the groove. The clamp support 30 differs from support 26 in that it has straight ends while support 31 differs 30 only in width and, since being on the end of a plate, has only one bore to receive a lug 25 of a clamping unit. All supports have holes 28 through which a screw may pass to lock the support in the groove.

A rotatable lockup shaft 40 extends longitudinally in the groove 20 and passes through the clamp supports carrying the clamping units of two adjacent plates. Rotation of the shaft in a counterclockwise or lockup direction as viewed in FIG. 3 will bring a first cam surface 41 contained on shaft 40 into contact with arm 8 causing the unit 6 to rotate until hook 12 engages a recess. Further rotation of shaft 40 will then move arm 8 so that face 16 is lifted off of member 7 further compressing the preloaded spring 9. Torsional deflection of the shaft 40 caused by the force necessary to lift the face 16 off of the member 7 of all the units will result in the hooks nearer the end of the cylinder engaging their associated recesses before the hooks nearer the middle of the cylinder engage their associated recesses. This gradual engagement of the hooks reduces the amount of instantaneous force necessary to rotate the shaft in order to lock all the plates to the cylinder.

The distance between member 7 and face 16 varies with plate register positioning and the machining of the recesses in the plate ends when the various members are in operating position. This distance is such that the spring is always compressed an amount greater than that caused by the preload so that the locking force exerted by the finger 12 on a recess will always at least equal the preload force previously determined to be the minimum force required for locking when the press is operated at its highest speed.

The shaft 40, when rotated to the unlocked position, will allow the arm 8 and face 16 to contact the member 7 so that the preload of the spring is taken up. Further rotation of the shaft in the clockwise direction as shown in FIG. 3 will cause the cam 41 to hit a projection 43 contained on the hook member which in turn will cause the hook member to rotate in the clamp supports so that the finger 12 will move out of the recess 4 and so that the plate lifting finger 14 will force the plate 3 off of the cylinder.

Belleville type springs are particularly adaptable for use with the self-contained clamping unit since the spring strength may be readily varied by changing the number of individual discs. A further advantage of using Belleville springs is that a strong spring may be utilized in a small amount of space. A still further important advantage of using Belleville type springs in that the characteristics of such springs are that the spring force remains substantially constant at higher limits of compression. That is to say, after the spring has been compressed a predetermined amount, in this case the amount determined by the number of turns of nut 11, further compression of the spring does not necessarily produce a proportionately greater force. This is advantageous in that it insures a constant uniform spring force being exerted on the hook member by the spring and thus a constant force by the hook on the plate. Thus if the plate is slightly skewed or the recesses in the plate are misaligned, the force with which the various hooks engage the rcesses will still be substantially the same and constant since the Belleville springs will allow the hook members to move to compensate for the misalignments while still exerting the same force.

Still a further advantage of using the Belleville spring is that the spring itself is protected by the hook member from dirt or from being damaged when the calmping unit is removed from the cylinder.

The opposite edge of the plate is held to the cylinder by means of a register hook member 50 as shown in FIG. 9 which has mounted thereon hooks 51 which in turn engage with the recesses 5 contained on the inside edge of the plate. The member 50, of which there are two for each plate, is urged in a circumferential direction away from the recess 5 by means of springs 53 which extend into bores 54 contained in the member 50. The member 50 is urged against the force of springs 53 in a direction in which the hooks 51 engage the recesses by means of axially extending adjustment bars 57 as shown in FIG. 10 which have therein wedged 58 which engage a slide 59 contained on the member 50. By moving the adjustment bars 57 axially of the plate cylinder, the wedges 58 will cause the member 50 and hooks 51 to move circumferentially of the printing cylinder and so engage the recesses 5 in the plate in order to properly position the plate on the cylinder.

The wedges 58 are angle pieces made of a hardened material which in turn fit over reduced portions 57' of the bars 57 as shown in FIG. 11. The length of the bars may be changed to accommodate printing plates of different widths or to accommodate different paper widths, all of which require different spacing of the register hooks. The change is made by merely moving the wedge 58 on to a new bar of desired length as shown in FIG. 10 or by varying the distance between axially adjacent wedges by changing the length of connecting pieces 70 joining the two halves of the bar 57 also as shown in FIG. 10.

A screw 60 shown in FIG. 4 extends into a threaded tap 61 contained in the bar 57 and has a bevel gear 62 mounted at one end. A second bevel gear 63 meshes with bevel gear 62 and is mounted on the end of a shaft 63' which is contained in a bushing 64' and which in turn may be rotated by a wrench 65 inserted into the side of the printing cylinder. A set screw 67 locks the bushing 64 in position.

A feature of my invention is that the register adjusting shafts 63' are located in convenient spots on the printing cylinder whereby the press operator may regulate the adjustment hooks and still be in a position to see the adjustment made. Thus the shafts 63' for regulation of the end plates are located on the face of the cylinder at its ends and the shafts 80 for regulation of the middle plates on the surface of the cylinder at its middle with each of the shafts being in the area of the plate with which it is associated, all as shown in FIG. 1.

Figure 12:
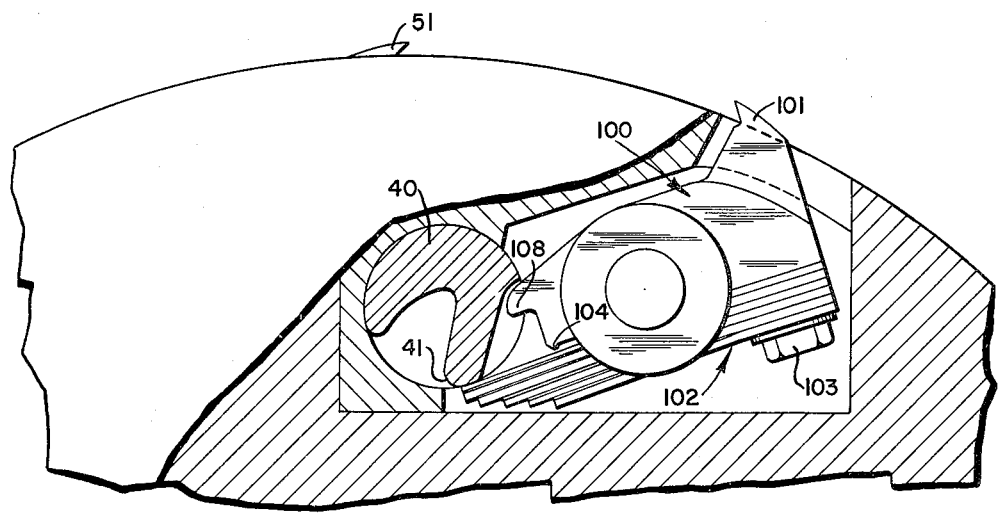
FIG. 12 is a partial sectional view illustrating a modified hook member in a printing cylinder.
Figure 13:
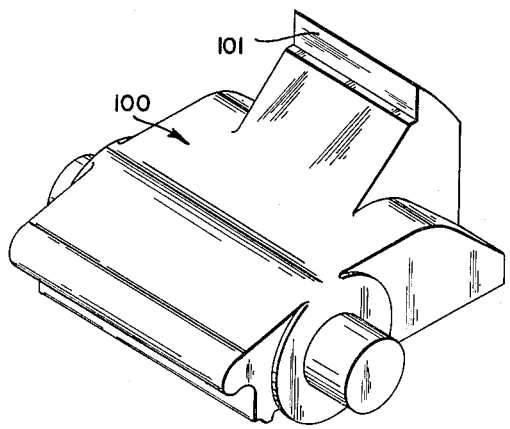
FIG. 13 is an enlarged perspective view of the hook member in a plate cylinder illustrated in FIG. 12.
Figure 14:
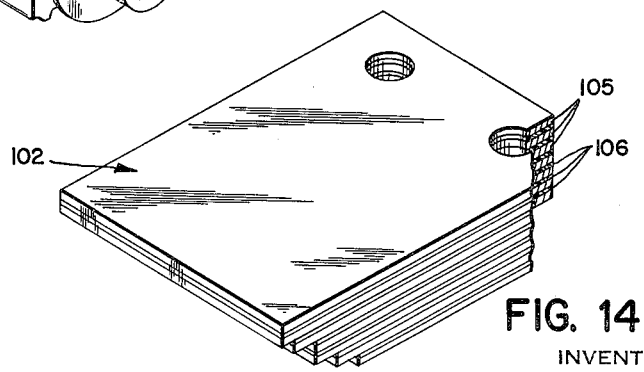
FIG. 14 is an enlarged perspective view illustrating the spring in FIG. 12.
Figure 15:
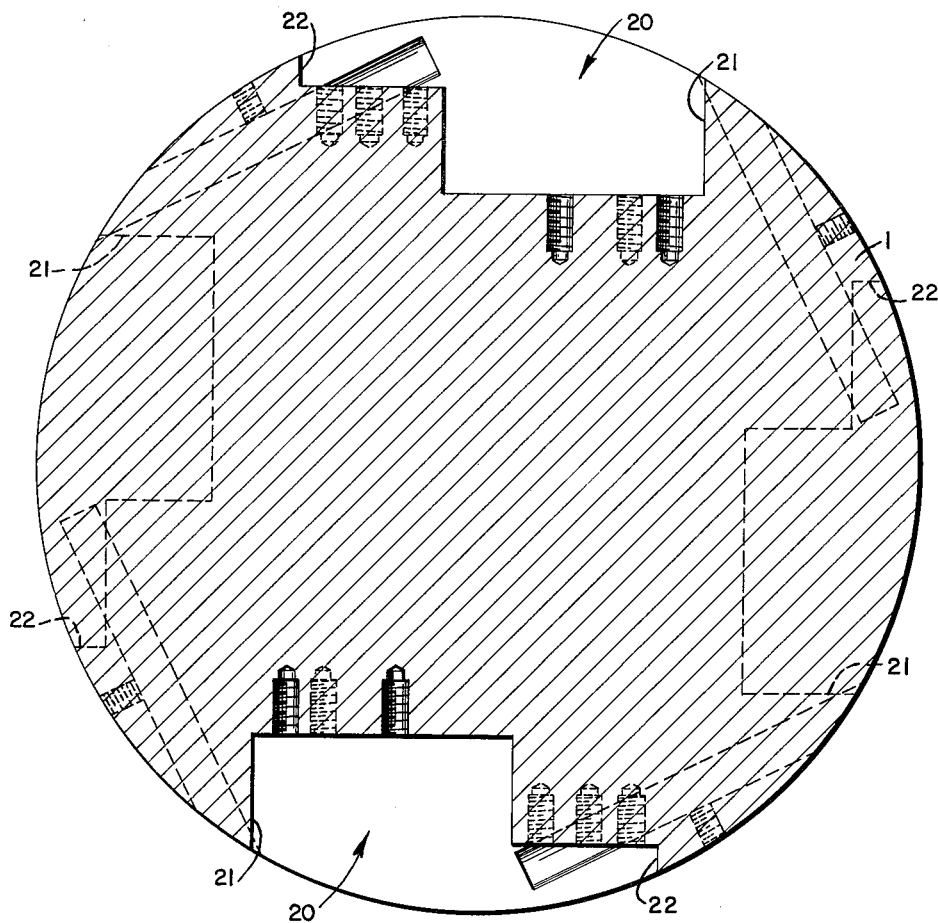
FIG. 15 is an enlarged cross-sectional view of the printing cylinder illustrated in FIG. 1.

Referring to FIG. 12, there is shown a different type clamping unit than that shown in FIG. 3. The unit there illustrated utilizes a cantilever type spring instead of a Belleville spring. A hook member 100 has hooks 101 which engage the recesses of the leading edge of the plates as in the manner described above. A cantilever spring 102 is mounted on one end of the hook member 100 by means of bolts 103 so that the free end of the spring rests upon a lip 104 contained on the hook member.

The spring itself comprises a plurality of spring leaves 105 separated by thin sheets of a tetrafluoroethylene resin 106. The thin sheets 106 provide a lubricated surface between adjacent leaves of the spring to insure that the spring characteristics will be the same upon each deflection thereof and will not vary because one leaf is prevented from moving with respect to an adjacent leaf.

The lockup shaft 40 is similar to that shown in FIG. 3 and has thereon the cam surface 41 to engage the bottom leaf of the spring in order to lift it off the lip 104 when the shaft is rotated in a clockwise direction and after the finger 101 engages the recess. The distance between the bottom leaf and lip compensates for any discrepancies in machining of the plate and change in plate registering while allowing at least the preload force to be exerted on the hooks by the preloaded spring. Rotation of shaft 40 in the counterclockwise direction from the position shown in FIG. 12 will allow the lip 104 to contact the bottom leaf of the spring 102 and thus take up the prestressed forces in the spring. Further rotation of the shaft 40 in the counterclockwise direction will cause the cam surface 41 to contact a projection 108 to rotate the hook member out of contact with the recess in the plate.

The clamping unit illustrated in FIG. 12 has many of the advantages as that shown in FIG. 3 in that the unit is self-contained. Both clamping units may be easily replaced or their axial positions varied. This is done by removing a cover plate 71 held to the cylinder by screws 72 and 73. Screws 29 are then removed allowing the clamp supports 26, 30 and 31 to be removed along with shaft 40. The supports are then slid off the shaft allowing the clamping units to be removed. The axial position between the supports and thus the axial distance between the hooks 12 is then varied by substituting supports of different widths or by adding spacers between the supports.

Use of the clamping units illustrated eliminates any effect that torsional deflection of the lockup shaft may have on the tension exerted on the plates. A hook of a tension lockup apparatus must exert approximately 300 lbs. force so that in a conventional printing plate where there are four hooks, there is a total force of 1200 lbs. tension exerted on the plate which, in a conventional lockup apparatus where the hooks are mounted on the shaft, is taken up by the rotatable shaft itself. These high forces produce considerable torsional deflection of the shaft resulting in the hooks near the operating end of the shaft exerting a high force on the plate while those further away exerting less force. This uneven loading in turn tends to misalign the plates on the cylinder. However, by utilizing separate self-contained clamping units, the prestressed spring force in each unit will itself independently urge each hook into engagement with a recess and, where the spring forces are equal, the resultant forces on the plate will be equal thus reducing chance of misalignment.

Figure 16:
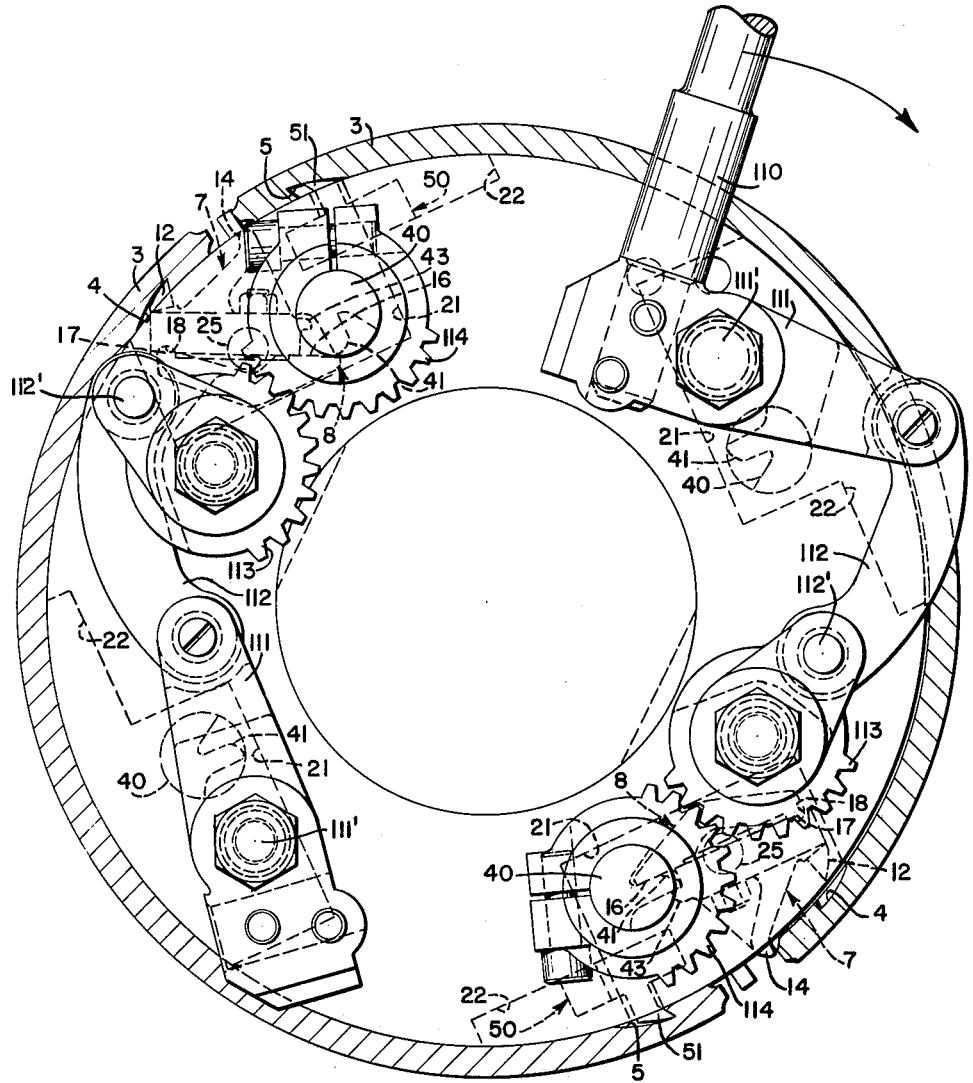
FIG. 16 is an enlarged cross-sectional view of FIG. 1 illustrating the operating mechanism for the lockup shaft.

Referring to FIG. 16, there is illustrated a latch mechanism for operating the lockup shaft. A removable lever 110 fits into a pivotable arm 111 mounted on one end of the printing cylinder which in turn connects with a second pivotable lever 112. Lever 112 has on the end thereof a gear section 113 which meshes with a gear 114 contained on the end of the lockup shaft 40. By moving the handle 110 in the direction shown in FIG. 16, the lever 111 is caused to move clockwise about its fulcrum point 111' thus moving the lever 112 and gear 113 counterclockwise about its fulcrum 112'. This in turn will cause the gear 114 and shaft 40 to move in a clockwise direction to unlock the clamping unit allowing two axially adjacent plates on one end of the cylinder to be removed from the cylinder. A similar mechanism is contained on the other end of the cylinder in order that the two plates adjacent that end of the cylinder may be unlocked and diametrically opposed mechanisms are included in the cylinder for locking and unlocking the plates diametrically opposed to those shown in FIG. 1. Interlock switches, not shown, may be included to insure that lever 110 can only be moved when the press drive motors are disconnected.

Still a further characteristic of my invention is the configuration and positioning of the grooves into which the clamping and register mechanisms fit. Printing cylinders must be strongly constructed in order to prevent deflection of the cylinder due to its own weight and also to prevent deflection of the cylinder due to the impact forces resulting from the impression roll hitting the gutter formed between diametrically opposite plates. It is, therefore, important that cross-sectional area of the cylinder at the points where high deflection forces occur be maintained at a maximum in order to increase roll stiffness.

The slots as illustrated in the figures are L-shaped with each having a major leg 21 and a minor leg 22. The sides of the slots are straight in order to facilitate machining and the sides of the slots are so positioned that the sides of a major leg of one slot are not in line with the sides of a diametrically opposed major leg of another slot and also are not in line with the center of the cylinder. In this manner, a maximum of cross-sectional area is preserved in the center of the cylinder in order to increase the moment of inertia which in turn increases the stiffness factor of the cylinder. Further the slots on one end of the cylinder extend only from the end of the cylinder to a point short of the center line of the cylinder while the slots on the other end of the cylinder likewise extend to a point short of the center line of the cylinder but are staggered with respect to the first-mentioned slots thus allowing a substantially solid cross-sectional area to be at the center line of the cylinder where deflection forces are the greatest. The only relief provided at the center line of the cylinder are the relatively small holes accommodating shafts 63', bushings 64 and set screws 67.

As illustrated in the drawings, the slots are positioned or staggered at 90° intervals as the cylinder is meant for broad-sheet newspaper printings. It is apparent, however, that the mechanism shown would be applicable to tabloid printing wherein the slots may have different stagger, for example 45°, in order to keep impression on half the cylinder width and keep the form rollers in contact with one-half of the plates when printing full width web.

Figure 17:
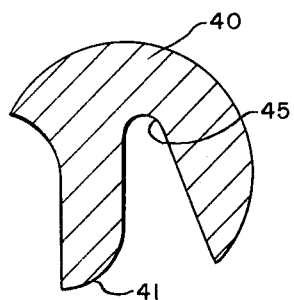
FIG. 17 is a cross-sectional view of a modified lockup shaft taken along lines 17—17 of FIG. 1; and, FIG. 18 is a cross-sectional view of the lockup shaft of FIG. 17 taken along lines 18—18 of FIG. 1.
Figure 18:
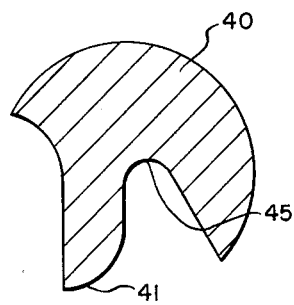

A modified form of a rotatable lockup shaft is illustrated in FIGS. 17 and 18 wherein the torsional deflection of the shaft when rotated to a lockup position is increased by varying the cross-sectional area of the shaft along its length. The cross-sectional area of the shaft may be varied as shown in FIG. 17 by making a relatively large cut out 45 at the end of the shaft adjacent the end of the cylinder and gradually reducing and tapering the cut out evenly along the length of the shaft until its cross-sectional area is greater at its opposite end as shown in FIG. 18, this opposite end of the shaft being nearer to the middle of the cylinder as shown in FIG. 1. If necessary, the circumferential length of the high dwell on the cam surface 41 may be varied with the greater circumferential length being on that part of the shaft having the greater cut out to insure that the hooks nearer the end of the cylinder which are the first brought into locking engagement will remain fully locked while the remainder of the hooks nearer the middle of the cylinder are brought into locking engagement. The effect of the increase of the torsional deflection is to even further reduce the total amount of force necessary to move all of the hooks actuated by a single shaft into locking engagement with their associated recesses.

It is apparent that other changes may be made in the mechanism described which still comes within the scope of the invention as defined by the appended claims.

I claim:

1. An underside tension lockup apparatus for locking a plurality of printing plates onto a printing cylinder by means of movable register hooks and movable clamp-up hooks contained in the cylinder and engaging recesses in the undersides of the plates wherein said plates are positioned on diametrically opposite sides of said cylinder and wherein axial adjacent plates extend along the length of said cylinder comprising:

(a) a plurality of substantially L-shaped grooves for containing said clamping and register hooks positioned on diametrically opposite sides of said cylinder and extending along a length of said cylinder with each said groove having a major leg extending towards the center of said cylinder and a minor leg extending perpendicular to said major leg and with the sides of the major legs of said grooves when extended being separated and parallel to provide a maximum cross-sectional area of the cylinder to compensate for deflection forces and each said groove containing register hooks and actuation means for moving said register hooks associated with one printing plate, and clamp-up hooks and actuation means for moving the clamp-up hooks associated with a diametrically opposite printing plate.

2. An underside tension lockup apparatus according to claim 1 wherein:

(a) two first said L-shaped grooves extend on diametrically opposite sides of said cylinder from one end of said cylinder to substantially the middle thereof, and (b) two second L-shaped grooves are staggered circumferentially with respect to said two first grooves extending from the other end of said cylinder to substantially the middle part thereof whereby the middle portion of said cylinder is substantially solid in cross section to provide maximum resistance against deflection forces.

3. An underside tension lockup apparatus for locking a pair of printing plates under tension onto a printing cylinder wherein said plates have a plurality of recesses on their undersdies along their edges for the recepiton of clamping and holding hooks and which plates are positioned on diametrically opposite sides of said cylinder comprising:

(a) two grooves extending along a portion of the length of the cylinder on diametrically opposite sides thereof, (b) a rotatable lockup shaft in each said groove having cam surfaces thereon, (c) holding hooks in each said groove for engaging the recesses of both plates along their edges, (d) a plurality of clamp supports in each said groove with the shaft in the groove extending therethrough, and (e) a plurality of self-contained clamping units in said groove rotatably supported by adjacent clamp supports wherein each said unit has a hook member for engaging a recess adjacent an edge of a plate and a preload means operatively positioned between said hook member and said cam surface on said shaft whereby when said shaft is rotated to the lockup position, said hook member is urged into engagement with a recess under the force of said preload means, and wherein the cross-sectional area of each said lockup shaft varies along its length to increase the torsional deflection of the shaft when rotated to a locking position to further vary the instant of application of the force of the preload means to said hook members whereby the total amount of force necessary to rotate each said lockup shaft to a locking position is reduced.

4. An underside tension lockup apparatus for locking a pair of printing plates under tension onto a printing cylinder wherein said plates have a plurality of recesses on their undersides along their edges for the reception of clamping and holding hooks and which plates are positioned on diametrically opposite sides of said cylinder comprising:
  (a) two grooves extending along a portion of the length of the cylinder on diametrically opposite sides thereof,
  (b) a rotatable lockup shaft in each said groove having cam surfaces thereon,
  (c) holding hooks in each said groove for engaging the recesses of both plates along their edges,
  (d) a plurality of clamp supports in each said groove with the shaft in the groove extending therethrough, and
  (e) a plurality of self-contained clamping units in said groove rotatably supported by adjacent clamp supports wherein each said unit has a hook member for engaging a recess adjacent an edge of a plate, a preload means operatively positioned between said hook member and said cam surface on said shaft whereby when said shaft is rotated to the lockup position said hook member is urged into engagement with a recess under the force of said preload means, wherein said preload means comprises a cantilever type spring connected at one end of said hook member and adapted to be engaged on its free end by said cam surface on said shaft, and a lip positioned between a part of said cantilever spring and said hook member whereby said cantilever spring is prestressed; said shaft when rotated in a lockup direction to bring a hook into engagement with a recess causing said cam surface to lift the free end of said spring from said hook member against the force of said prestressed cantilever spring.

5. A tension lockup device according to claim 4 wherein:
  (a) said cantilever spring comprises a plurality of superimposed leaf springs separated by a film of tetrafluoroethylene resin to decrease friction between adjacent leaves.

6. An underside tension lockup apparatus for locking a pair of printing plates under tension onto a printing cylinder wherein said plates have a plurality of recesses on their undersides along their edges for the reception of clamping and holding hooks and which plates are positioned on diametrically opposite sides of said cylinder comprising:
  (a) two grooves extending along a portion of the length of the cylinder on diametrically opposite sides thereof,
  (b) a rotatable lockup shaft in each said groove having cam surfaces thereon,
  (c) holding hooks in each said groove for engaging the recesses of both plates along their edges,
  (d) a plurality of clamp supports in each said groove with the shaft in the groove extending therethrough,
  (e) a plurality of self-contained clamping units in said groove rotatably supported by adjacent clamp supports wherein each said unit engages a cam surface on said shaft and has a hook member for engaging a recess adjacent an edge of a plate,
  (f) a pivotable actuator arm coextensive with each said hook member and in engagement at one end with said cam surface on said shaft, and
  (g) preloaded Belleville type springs operatively positioned to act between the two ends of each said arm and its associate hook member to urge said arm towards its associate hook member such that when said shaft and cam surface are rotated to a lockup position and said hook member is brought into engagement with a recess, the end of said arm engaging said cam surface is moved out of engagement with its associated hook member against the force of said preloaded springs.

References Cited by the Examiner
UNITED STATES PATENTS

| | | | |
|---|---|---|---|
| 2,708,110 | 5/1955 | Clay | 267—1 |
| 2,818,806 | 1/1958 | Harless | 101—378 |
| 2,857,841 | 10/1958 | Worthington | 101—378 |
| 2,900,903 | 8/1959 | Chase | 101—378 |

ROBERT E. PULFREY, *Primary Examiner.*
EUGENE R. CAPOZIO, *Examiner.*